(12) United States Patent
Li et al.

(10) Patent No.: US 12,060,280 B2
(45) Date of Patent: Aug. 13, 2024

(54) METHOD OF MAKING AEI-TYPE ZEOLITES HAVING A HIGH SILICA TO ALUMINA RATIO (SAR)

(71) Applicant: Pacific Industrial Development Corporation, Ann Arbor, MI (US)

(72) Inventors: Yunkui Li, Ann Arbor, MI (US); David Shepard, South Lyon, MI (US); De Gao, Troy, MI (US); Wei Wu, Ann Arbor, MI (US); Jeffery Lachapelle, Northville, MI (US); Geng Zhang, Utsunomiya (JP)

(73) Assignee: Pacific Industrial Development Corporation, Ann Arbor, MI (US)

( * ) Notice: Subject to any disclaimer, the term of this patent is extended or adjusted under 35 U.S.C. 154(b) by 277 days.

(21) Appl. No.: 17/271,233

(22) PCT Filed: Aug. 23, 2019

(86) PCT No.: PCT/US2019/047828
§ 371 (c)(1),
(2) Date: Feb. 25, 2021

(87) PCT Pub. No.: WO2020/046725
PCT Pub. Date: Mar. 5, 2020

(65) Prior Publication Data
US 2021/0323832 A1    Oct. 21, 2021

Related U.S. Application Data

(60) Provisional application No. 62/724,119, filed on Aug. 29, 2018.

(51) Int. Cl.
| | | |
|---|---|---|
| *C01B 39/48* | (2006.01) | |
| *B01J 29/76* | (2006.01) | |
| *B01J 35/02* | (2006.01) | |
| *B01J 35/10* | (2006.01) | |
| *B01J 35/50* | (2024.01) | |
| *B01J 35/61* | (2024.01) | |
| *B01J 37/00* | (2006.01) | |
| *B01J 37/03* | (2006.01) | |
| *B01J 37/04* | (2006.01) | |
| *B01J 37/10* | (2006.01) | |
| *B01J 37/30* | (2006.01) | |

(52) U.S. Cl.
CPC .............. *C01B 39/48* (2013.01); *B01J 29/76* (2013.01); *B01J 35/50* (2024.01); *B01J 35/615* (2024.01); *B01J 35/617* (2024.01); *B01J 37/0018* (2013.01); *B01J 37/031* (2013.01); *B01J 37/036* (2013.01); *B01J 37/04* (2013.01); *B01J 37/10* (2013.01); *B01J 37/30* (2013.01); *B01J 2229/186* (2013.01); *C01P 2004/61* (2013.01); *C01P 2006/12* (2013.01)

(58) Field of Classification Search
CPC ....... C01B 39/48; C01B 29/76; C01B 35/026; C01B 35/1019; C01B 35/1023; C01B 37/0018; C01B 37/031; C01B 37/036; C01B 37/04; C01B 37/10; C01B 37/30; C01B 35/615; C01B 35/50; C01B 35/617
See application file for complete search history.

(56) References Cited

U.S. PATENT DOCUMENTS

| | | | | |
|---|---|---|---|---|
| 5,958,370 | A | * | 9/1999 | Zones ....................... C10G 3/50 |
| | | | | 423/706 |
| 2018/0230017 | A1 | * | 8/2018 | Ishikawa ................. C01B 39/48 |

FOREIGN PATENT DOCUMENTS

| | | |
|---|---|---|
| CN | 107074569 A | 8/2017 |
| CN | 107285334 A | 10/2017 |
| CN | 107922205 A | 4/2018 |
| CN | 1082907478 A | 7/2018 |
| EP | 3222583 A1 | 9/2017 |
| EP | 3336060 A1 | 6/2018 |
| JP | 201650142 A | 4/2016 |
| JP | 2016538217 A | 12/2016 |
| JP | 2017036204 A | 2/2017 |
| JP | 2017039638 A | 2/2017 |
| JP | 2017048105 A | 3/2017 |

OTHER PUBLICATIONS

Moliner et al., Chem. Commun., (2012), v48, p. 8264-8266.*

(Continued)

*Primary Examiner* — Yong L Chu
(74) *Attorney, Agent, or Firm* — Dickinson Wright PLLC

(57) ABSTRACT

A method of forming an AEI-type zeolite in a hydrothermal synthesis without the use of hydrogen fluoride (HF) and in the absence of any FAU zeolite Y. A gel composition formed upon using this method includes one or more sources of silica; one or more sources of alumina, one or more organic structure directing agents (OSDA); a source of alkali metal ions; and water. This gel composition is defined by the molar ratios of: $SiO_2/Al_2O_3$ 16:1 to 100:1; $M_2O/SiO_2$ 0.15:1 to 0.30:1; $ROH/SiO_2$ 0.05:1 to 0.20:1; and $H_2O/SiO_2$ 5:1 to 20:1; wherein M is the alkali metal ion and R is an organic moiety derived from the OSDA. This gel composition, after reacting at a temperature between 135° C. to about 180° C. for 15 hours to 168 hours forms the crystalline AEI-type zeolite having a silica to alumina ratio ($SiO_2:Al_2O_3$) that is greater than 8:1.

15 Claims, 6 Drawing Sheets

(56) References Cited

OTHER PUBLICATIONS

Liu et al., Microporous and Mesoporous Materials, (1998), v25, p. 1-6.*
European Patent Office, Rijswijk, Netherlands, International Search Report of International Application No. PCT/US2019/047828, Mailed on Nov. 5, 2019, 4 pages.
Maruo, Toshihiro et al., "Facile Synthesis of AEI Zeolites by Hydrothermal Conversion of FAU Zeolites in the Presence of Tetraethylphosphonium Cations," Chemistry Letters, vol. 43, No. 3, Nov. 12, 2013, 3 pages (302-304), XP055279856, Japan, ISSN: 0366-7022, DOI: 10.1246/cl. 130996.

* cited by examiner

METHOD OF MAKING AEI-TYPE ZEOLITES HAVING A HIGH SILICA TO ALUMINA RATIO (SAR)

CROSS REFERENCE TO RELATED APPLICATIONS

This application is a national stage filing of International Application No. PCT/US2019/047828 filed on Aug. 23, 2019, designating the United States and published in English, which claims the benefit of the filing date under 35 U.S.C. § 119(e) of U.S. Provisional Application No. 62/724,119 filed on Aug. 29, 2018, the entire contents of which are both incorporated herein by reference in their entirety.

This disclosure relates generally to a method of making an AEI-type zeolite that has a high silica to alumina ratio (SAR), the AEI-type zeolites formed according to said method, and the gel compositions formed during and used in the method of making the AEI-type zeolites.

The statements in this section merely provide background information related to the present disclosure and may not constitute prior art. Microporous zeolites, which contain three-dimensional channels, play an important role in the selective catalytic reduction (SCR) of exhaust emissions arising from diesel engines. An AEI-type zeolite represents one type of aluminosilicate zeolite that may be used as a catalyst support in this application due to its small cage opening size and hence high hydrothermal stability.

AEI-type zeolites may be synthesized using an FAU zeolite Y as a building unit due to the fast hydrothermal conversion of its double 6 members rings to an AEI-type structure. However, the use of an FAU zeolite Y is expensive as compared to other silica and alumina sources.

AEI-type zeolites may also be synthesized from alumina and silica precursors in the presence of hydrofluoric acid. Typically, the use of hydrofluoric (HF) acid inhibits the inclusion of aluminum in the zeolite structure, thereby resulting in zeolites having a silica to alumina ratio in excess of 200. Hydrofluoric acid (HF) is generally impractical for use in industrial processes, particularly, when conducted at an elevated temperature, due to the extreme consequences associated with human contact thereof.

SUMMARY

This disclosure relates generally to an inexpensive method of making an AEI-type zeolite that has a high silica to alumina ratio (SAR), the AEI-type zeolites formed according to said method, and the gel compositions formed during and used in the method of making the AEI-type zeolites.

According to one aspect of the present disclosure, the method of making an AEI-type zeolite, the method comprising the steps of: a) providing a source of silica; b) providing a source of alumina; c) providing an organic structure directional agent (OSDA); d) providing a source of alkali metal ions; e) mixing the source of silica, alumina, OSDA, and alkali ions in water to form a gel composition; f) heating the gel composition to a crystallization temperature that is in the range of about 135° C. to about 180° C.; g) maintaining the gel composition at the crystallization temperature for a time period that ranges from 15 hours to 168 hours; h) allowing the AEI-type zeolite to crystallize and precipitate; the gel composition forming a crystalline precipitate of the AEI-type zeolite and a mother liquid; and i) separating the crystalline precipitate from the mother liquid. The AEI-type zeolite so formed exhibits a silica to alumina ($SiO_2:Al_2O_3$) molar ratio of at least 8:1. This method is a hydrothermal synthesis without the use of hydrogen fluoride (HF) that yields the AEI-type zeolite in the absence of any FAU zeolite Y.

According to another aspect of the present disclosure, the method may further comprise the step of j) adding a zeolite that exhibits the AEI framework to the gel composition as a "seed" in order to further facilitate the formation of the AEI-type zeolite, the seed being present in an amount of 0.01% relative to about 10% silica. When utilized, the seed is generally present in an amount of 0.01% relative to about 1% silica.

According to yet another aspect of the present disclosure, the method may also comprise repeating steps a) to i) and j) when present. In this case, the mother liquid is used as at least a portion of the water in step e).

According to still another aspect of the present disclosure, a gel composition is provided wherein after reacting at a temperature between 135° C. to about 180° C. for 15 hours to 168 hours forms a crystalline AEI-type zeolite having a silica to alumina ratio ($SiO_2:Al_2O_3$) that is greater than 8:1. This gel composition is generally comprised of the components of one or more sources of silica; one or more sources of alumina, one or more organic structure directing agents (OSDA); a source of alkali metal ions; and water. The components in the gel composition may be present in the following molar ratios:

| | |
|---|---|
| $SiO_2/Al_2O_3$ | 16:1 to 100:1; |
| $M_2O/SiO_2$ | 0.15:1 to 0.30:1; |
| $ROH/SiO_2$ | 0.05:1 to 0.20:1; and |
| $H_2O/SiO_2$ | 5:1 to 20:1; | wherein M is the alkali metal ion and R is an organic moiety derived from the OSDA.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7:
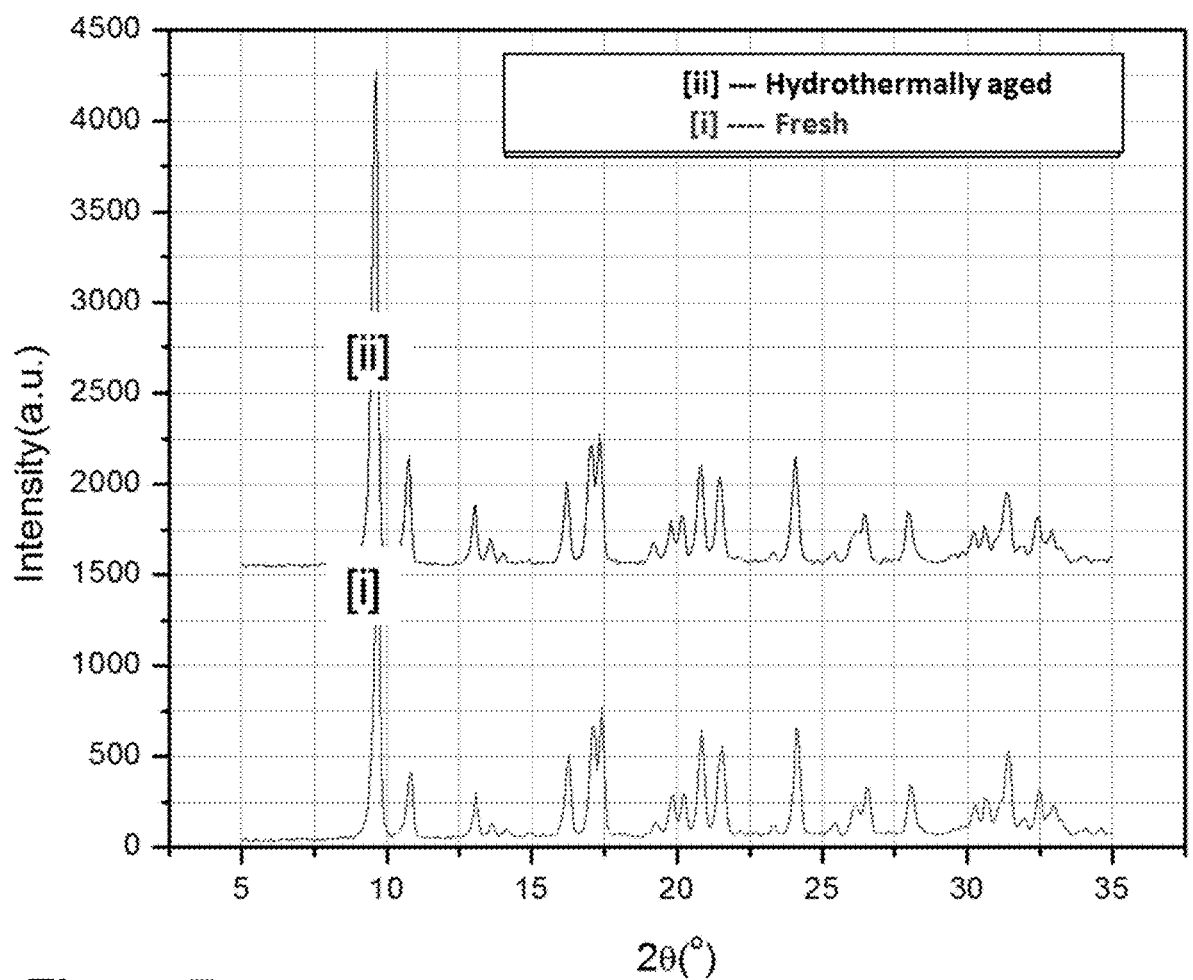
Figure 8:
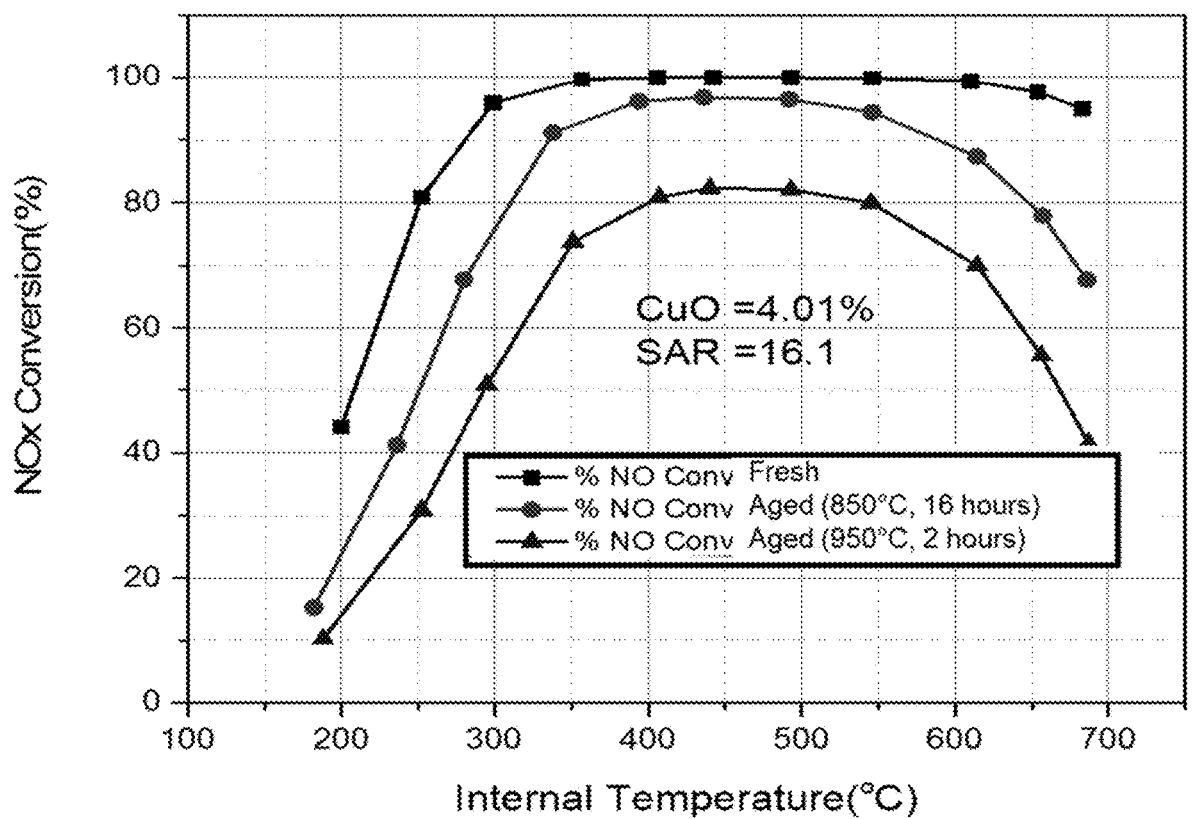

FIG. 7 is a graphical representation of x-ray powder diffraction analysis spectra obtained for freshly prepared and hydrothermally aged AEI-type zeolites formed according to the teachings of the present disclosure; and FIG. 8 is a graphical representation of the NOx conversion for freshly prepared and hydrothermally aged AEI-type zeolites formed according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the catalyst support made and used according to the teachings contained herein is described throughout the present disclosure in conjunction with a selective catalytic reduction (SCR) catalyst in order to more fully illustrate the composition and the use thereof. The incorporation and use of such an AEI-type zeolite in other applications, such as adsorbents, ion exchange agents, or as a support material used for industrial catalysts and/or environmental catalysts is contemplated to be within the scope of the present disclosure. It should be understood that throughout the description, corresponding reference numerals indicate like or corresponding parts and features.

The present disclosure provides an economical synthetic method for forming an aluminosilicate AEI-type zeolite in which an expensive FAU zeolite Y is not utilized as a building unit and the resulting AEI-type zeolite is substantially free of fluorine, fluorine-containing compounds and fluorine ions. The synthetic method described herein may be described as a hydrothermal synthesis conducted at an elevated temperature, thereby, making the use of hydrofluoric acid (HF) impractical. In addition, the AEI-type zeolite formed according to the method described above and further defined herein is economically feasible for use in most applications. The prior use of an expensive FAU zeolite Y in conventional methods made the use of AEI-type zeolites cost prohibitive for applications, such as a support material for a catalyst in a selective reduction reaction (SCR) of NOx contained in the exhaust gas of a vehicle.

In general, zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof.

The notation, "AEI" represents a code specified by the International Zeolite Associate (IZA) that defines the framework structure of the zeolite. Thus an "AEI-type" zeolite means an aluminosilicate in which the primary crystalline phase of the zeolite is "AEI". In the AEI-type zeolite of the present disclosure, the presence of another crystalline phase or framework structure, such as "FAU", in the zeolite is absent or nonexistent. In other words, the AEI-type zeolite of the present disclosure is substantially free of other crystalline phases and is not an intergrowth of two or more framework types.

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the AEI structure as described in the definition provided by the IZA is within expected tolerance.

Figure 1:
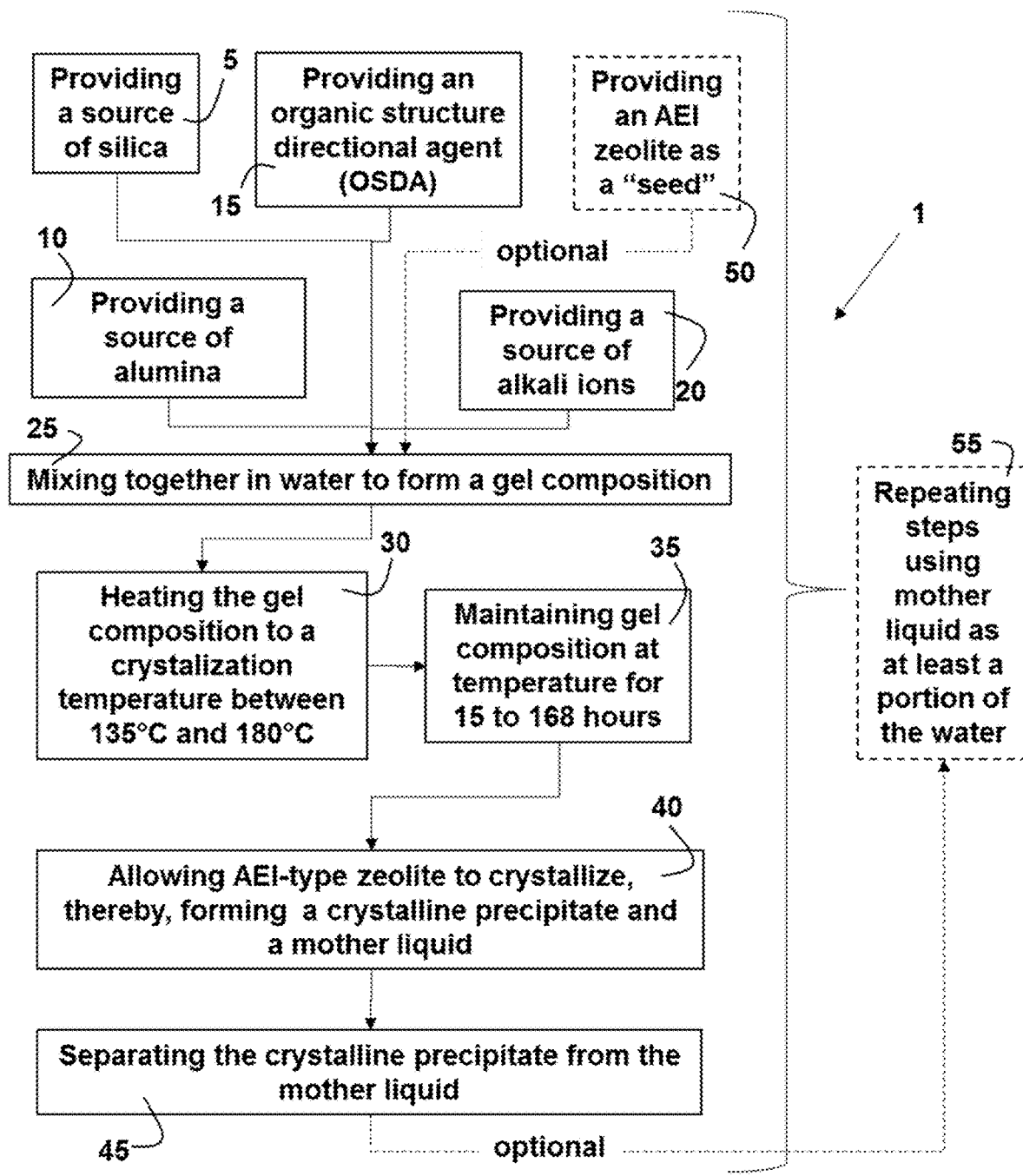
FIG. 1 is a flowchart of a process for preparing an AEI-type zeolite according to the teachings of the present disclosure.

Referring now to FIG. 1, a method 1 is provided for producing an AEI-type zeolite having a silica to alumina ($SiO_2:Al_2O_3$) ratio of at least 8 by using neither an expensive FAU zeolite Y or potentially harmful hydrogen fluoride, i.e., hydrofluoric acid (HF). Alternatively, the $SiO_2:Al_2O_3$ molar ratio (SAR) is at least 10; alternatively, at least 12; alternatively, about 14 or more; alternatively, greater than 17; alternatively, greater than 20. The $SiO_2:Al_2O_3$ ratio exhibited by the AEI-type zeolites may be measured using x-ray fluorescence (XRF) or inductively coupled plasma (ICP) emission spectroscopy.

Still referring to FIG. 1, the method 1 generally comprises the steps of:
 a) providing 5 a source of silica;
 b) providing 10 a source of alumina;
 c) providing 15 an organic structure directional agent (OSDA);
 d) providing 20 a source of alkali ions;
 e) mixing 25 the source of silica, alumina, OSDA, and alkali ions in water to form a gel composition;
 f) heating 30 the gel mixture to a crystalline temperature that is in the range of about 135° C. to about 180° C.;
 g) maintaining 35 the gel mixture at the crystalline temperature for a time period that ranges from 15 hours to 168 hours;
 h) allowing 40 the aluminosilicate AEI zeolite to crystallize and precipitate from the gel mixture; forming a crystalline precipitate and a mother liquid; and
 i) separating 45 the crystalline precipitate from the mother liquid.

When desirable, the method 1 of making the of the AEI-type zeolite described above and further defined herein may further include step j), which corresponds to providing 50 a small amount of an AEI zeolite to the gel composition as a "seed" to facilitate formation of the AEI-type framework. The amount of the AEI zeolite used as a "seed" may range in an amount from 0% to about 10% based on the amount of silica present in the gel composition. Alternatively, the amount of the AEI zeolite used in the seeding step j) is between 0.01% to about 5% based on the amount of silica in the gel composition; alternatively, in the range of 0.01% to 1% based on the silica. The AEI zeolite that is used as a "seed" may be in a calcined or uncalcined form as determined to be desirable.

The source of silica may comprise, consist essentially of, or consist of sodium silicate, silica sol, fumed silica, tetraethyl orthosilicate, or a mixture thereof. The amount of silica present in in the gel composition is determined by the amount necessary for each of the other raw materials to be within the ranges specified herein with respect to the silica in order to provide an AEI-type zeolite that exhibits the desired $SiO_2:Al_2O_3$ ratio.

The source of aluminum may comprise, consist essentially of, or consist of one or more of aluminum metal, aluminum hydroxide (e.g., gibbsite, boehmite, etc.), aluminum sulfate, aluminum nitrate, or a mixture thereof.

The organic structure directional agents (OSDA) that are used in the preparation of AEI-type zeolites are typically complex organic molecules capable of guiding or directing the molecular shape and pattern of the zeolite's framework.

Generally, the zeolite crystals form around the OSDA. After the crystals are formed, the OSDA is removed from the interior structure of the crystals, leaving a molecularly porous cage-like structure. The OSDA may include, but not be limited to N, N-Dimethyl-3,5-dimethylpiperidinium hydroxide, N, N-Diethyl-2, 6-dimethylpiperidinium hydroxide, or tetraethylphosphonium hydroxide. Alternatively, the OSDA is N, N-Dimethyl-3,5-dimethylpiperidinium hydroxide.

The source of alkali metal ions may comprise, consist essentially of, or consist of sodium hydroxide, potassium hydroxide, or a combination thereof. Alternatively, the alkaline source is sodium hydroxide. The inclusion of alkali metal ions in the gel composition helps to facilitate crystallization by forcing the OSDA to coordinate with aluminum in a preferred state. When a zeolite is to be used as an adsorbent or as a support for a catalyst, alkali metal atoms that are incorporated into the crystal structure of the zeolite during the formation of the zeolite may be removed from within the crystal structure by an ion exchange mechanism. An ion exchange mechanism is capable of replacing the alkali metal ions with hydrogen, ammonium, or any other desired metal ion.

Referring once again to FIG. 1, the method optionally comprises repeating 55 steps a)-i) and j) when present, wherein the mother liquid is used as at least a portion of the water in step e). The reuse of the mother liquor by repeating 55 the steps in the method provides the advantage of lowering the cost of the raw materials, as well as increasing the yield of AEI-type zeolite obtained from the hydrothermal reaction. This mother liquid after separation from the crystalline precipitate includes unreacted organic structure directing agent. The method may exhibit a yield of the AEI-type zeolite that is greater than or equal to (≥) 30%, ≥35%, ≥40%, ≥45%, ≥50%, ≥55%, ≥60%, ≥65%, ≥70%, ≥75%, ≥80%, ≥85%, ≥90%, or ≥95%. In order to facilitate crystallization and precipitation of the AEI-type zeolite, the amount of water in which the raw materials are mixed 25 (see FIG. 1) is in a molar ratio with silica ($H_2O:SiO_2$) that is typically at least 5:1 and no greater than 20:1 as further defined below.

According to one aspect of the present disclosure, the gel composition may be further described by molar ratios for each raw material with respect to the amount of silica ($SiO_2$). These molar ratios include those shown in Table 1, wherein M refers to the alkali metal and R refers to an organic moiety derived from the OSDA.

TABLE 1

| Raw Material Ratios in Gel Composition | |
|---|---|
| $SiO_2:Al_2O_3$ | 16:1 to 100:1 |
| $M_2O:SiO_2$ | 0.15:1 to 0.30:1 |
| $ROH:SiO_2$ | 0.05:1 to 0.20:1 |
| $H_2O:SiO_2$ | 5:1 to 20:1 |

Alternatively, the gel composition may be described by molar ratios of the raw materials with respect to the amount of silica ($SiO_2$) may include those provided in Table 2, wherein M refers to the alkali metal and R refers to an organic moiety derived from the OSDA.

TABLE 2

| Raw Material Ratios in Another Gel Composition | |
|---|---|
| $SiO_2:Al_2O_3$ | about 20:1 to about 60:1 |
| $M_2O:SiO_2$ | about 0.20:1 to about 0.26:1 |

TABLE 2-continued

| Raw Material Ratios in Another Gel Composition | |
|---|---|
| $ROH:SiO_2$ | about 0.06:1 to about 0.14:1 |
| $H_2O:SiO_2$ | about 7:1 to about 15:1 |

The gel composition formed in step e) may be subjected to hydrothermal conditions just after the preparation, or when desirable after undergoing a period of mixing, e.g., aging at a low temperature including, without limitation about room temperature or less than 100° C. over a period of about 1 to about 24 hours. During production on a large scale, a deterioration in the mixing the raw materials may be undesirable, in that a sufficient state of admixture is necessary to achieve high yield and proper crystallization of the AEI-type zeolites.

Still referring to FIG. 1, during implementation of the method 1, the gel composition is subjected to heating 30 at predetermined crystallization temperature for a predetermined amount of time. This hydrothermal synthesis utilizes a crystallization temperature that is in the range from 135° C. to 180° C.; alternatively, between about 145° C. to about 165° C. The time period over which the temperature is maintained 35 in order to result in the crystallization and precipitation of the AEI zeolite is between 15 hours and 168 hours; alternatively between about 24 hours and about 96 hours; alternatively between about 24 hours and about 48 hours.

Upon completion of the hydrothermal reaction, the AEI-type zeolite in the form of a crystalline precipitate is separated from remaining liquid (e.g., the mother liquid). The mother liquid may be discarded, when desirable, or reused as a replacement for at least a portion of the water that is used in the making of another batch of the AEI-type zeolite. This separation may use any known conventional method, including but not limited to, filtration, decantation, or centrifugation.

After separation from the mother liquid, the AEI-type zeolite, which may include some OSDA and/or alkali ions, may be collected, optionally washed with water, and then dried. The dried support material may be used in the dried state for some applications or subjected to calcination prior to use for other applications. Calcination of the AEI-zeolites at a high temperature (e.g., >450 C; alternatively, >550 C, etc.) removes any residual OSDA present in the porous structure.

According to another aspect of the present disclosure, the dried AEI-type zeolites formed according to the process described above and further defined herein exhibits an average particle size that is less than 5 micrometers (μm); alternatively, less than about 2 micrometers; alternatively, less than about 1 μm. The average particle size of the AEI-type zeolites may be measured using any known conventional method including, without limitation, SEM laser diffraction, dynamic light scattering, and sieving.

The "dried" AEI-type zeolites formed herein may also exhibit a BET specific surface area that is greater than 500 $m^2/g$; alternatively, at least 600 $m^2/g$; alternatively, equal to or greater than 700 $m^2/g$. The specific surface area of the AEI-type zeolites may be measured using a conventional Brunauer-Emmett-Teller (BET) method.

The morphology exhibited by the "dried" AEI-type zeolites may resemble cubes, square flakes, irregular particles, or a combination or mixture thereof. Alternatively, the morphology of the AEI-type zeolites resembles cubes, square flakes, or a mixture thereof.

According to another aspect of the present disclosure, a gel composition is provided that comprises a source of silica, a source of alumina, an organic structure directional agent (OSDA); a source of alkali metal ions, water, and optionally, a small amount of an AEI-zeolite as a "seed". The amount of each raw material present in the gel composition is provided relative to the amount of silica by the ratios shown in either Table 1 or Table 2. This gel composition after reacting at a temperature between 135° C. to about 180° C. for 15 hours to 168 hours forms a crystalline AEI-type zeolite having a silica to alumina ($SiO_2:Al_2O_3$) ratio that is greater than 8:1.

The use of the AEI-type zeolite formed according to the method of the present disclosure may include, without limitation, as a support material for a catalyst, an absorbent, or a separation material. The "dried" AEI-type zeolites may be used prior to or after calcination.

A catalyst may comprise the AEI-type zeolite with one or more catalytic metal ions exchanged for an atom in the framework or otherwise impregnated into the pores and/or cavities of the zeolite. Several examples of catalytic metal ions that may be incorporated into the AEI-type zeolite include, without limitation, ions of transition metals, platinum group metals (PGM), precious metals, such as gold or silver; alkaline earth metals, rare earth metals, or mixtures thereof. Transition metals may comprise, consist essentially of, or consist of copper, nickel, zinc, iron, tungsten, molybdenum, cobalt, titanium, zirconium, chromium, or tin. Platinum group metals may include, without limitation, ruthenium, rhodium, palladium, indium, and platinum. Alkaline earth metals include beryllium, magnesium, calcium, strontium, and barium. Rare earth metals include lanthanum, cerium, praseodymium, neodymium, europium, terbium, erbium, ytterbium, and yttrium.

The following specific examples are given to illustrate the disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

In the following examples, a HORIBA LA-920 laser particle sizer is used for the measurement of particle size distribution, a Rigaku MiniFlex II DESKTOP X-ray diffractometer is used for the measurement of phase and crystallinity, a Micromeritics TriStar II 3020 is used for the measurement of BET surface areas, a Spectro Analytical Instruments Model FCPSA83D ICP is used for analysis of chemical compositions, while zeolite morphology and particle size are measured using scanning electron microscopy (SEM).

Example 1—Preparation & Characterization of a Batch of AEI-Type Zeolites

The source of alumina used in this example was Gibbsite. A total of 261.01 grams of N, N-Dimethyl-3,5-dimethylpiperidinium hydroxide (TMPOH, 35%, Sachem Americas, Texas) was placed in 2 L autoclave. A sodium aluminate solution was prepared by using 130.35 grams NaOH (99%, NOAH Technologies Corp., Texas) and 306.35 grams deionized (DI) water to dissolve 25.402 grams Gibbsite, $Al(OH)_3$ (NOAH Technologies Corp., Texas). The sodium aluminate solution was added into TMPOH solution with stirring for 5 minutes. Then a total of 1076.88 grams colloidal silica (LUDOX AS-40, WR Grace, Maryland) was slowly added into above mixture solution and stirred for 30 minutes. A total of 5 grams proton type AEI seed was added in the gel made above And allowed to hydrothermally crystallize at 165° C. for 24 hours. Then, the slurry was filtered using a funnel filter With the collected wetcake being washed with 5 liters DI water and then dried in an oven at 120° C. overnight (e.g., about 10-12 hours). The resulting dried wetcake was broken apart and sieved through a 300 micrometer (μm) screen to obtain 158 grams of a zeolite in powder form.

Figure 2:
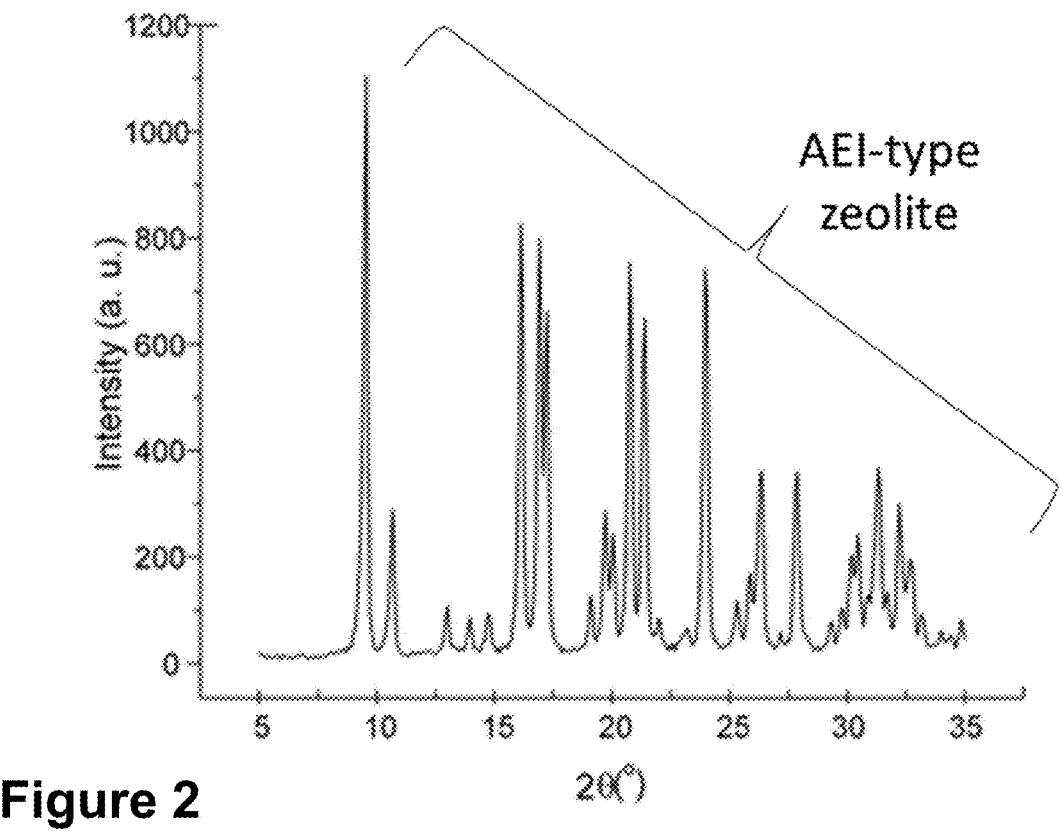
FIG. 2 is an x-ray diffraction (XRD) spectrum of the AEI-type zeolite made from Gibbsite according to the process of FIG. 1.

Referring now to FIG. 2, the measured x-ray diffraction (XRD) pattern for the zeolite collected and dried in this example shows an AEI-type structure or framework is present. The measured XRD pattern further demonstrates that this AEI-type zeolite is free of any other type of crystalline zeolite phase or structure such as the competing phase peaks of Analcime at 2e~15.78°, 18.24°, 25.98° and Mordenite at 2e~6.5°.

Figure 3:
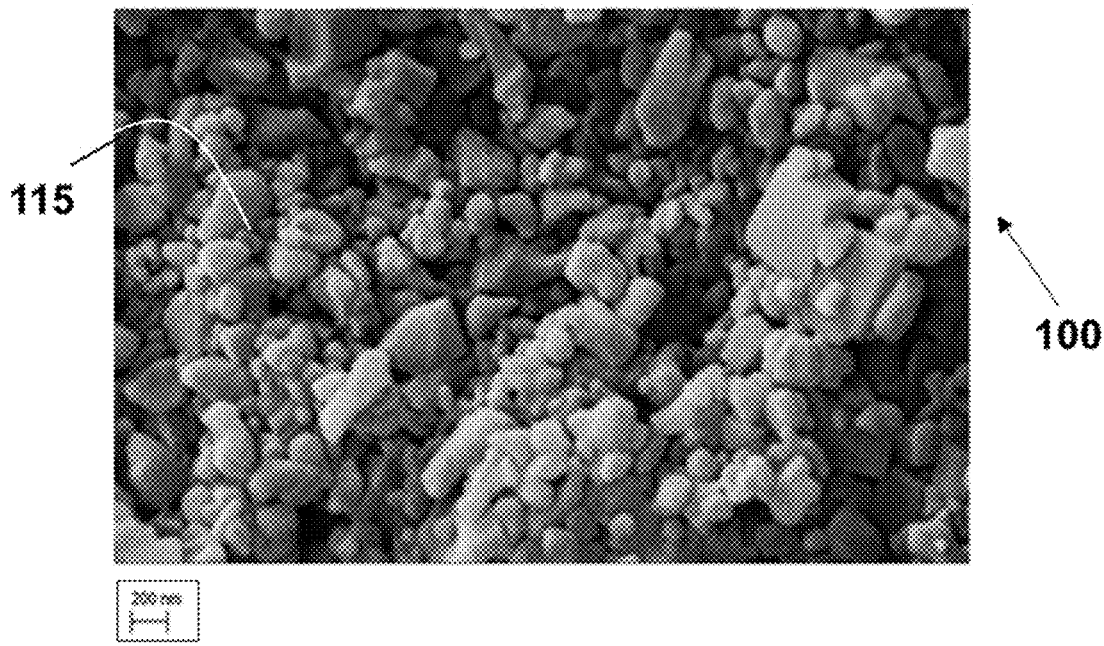
FIG. 3 is a scanning electron micrograph (SEM) of the AEI-type zeolite described in FIG. 2.

Referring now to FIG. 3, the morphology of the AEI-type zeolite 100 collected and dried in this example is shown is the scanning electron micrograph to include irregular particles 115 having an average size of less than 1 micrometer.

The collected powder was calcined in a muffle furnace at 550° C. for 8 hours to remove the template, i.e., the organic structure directional agent (OSDA) from the zeolite cage. Then, the calcined powder was subjected twice to ion exchange using ammonium chloride at room temperature (e.g., about 20-25° C.) for 1 hour. After solid-liquid separation, the wetcake was washed with DI water and then oven dried overnight to obtain an ammonia substituted form of the AEI-type zeolite. A protonated form of the AEI-type zeolite can be obtained by performing the calcination at 450° C. for 16 hours.

The silica to alumina ($SIO_2:Al_2O_3$) ratio (SAR) was measured by ICP to be on the order of 15.9 with an $Na_2O$ content of 30 ppm. The surface area (SA), pore volume (PV) and particle diameter (PD) was measured by BET with the data being shown below for both fresh zeolite and for the zeolite after being hydrothermally aged by exposure to 10% steam balanced by air at 900° C. for 3 hours:

Fresh: SA=682.27 $m^2/g$, PV=0.347 $cm^3/g$ and PD=2.0 nm
After Ageing: SA=710.28 $m^2/g$, PV=0.337 $cm^3/g$ and PD=1.9 nm.

Example 2—Preparation & Characterization of Another Batch of AEI-Type Zeolites The source of alumina used in this example was aluminum metal powder. A total of 130.35 grams NaOH (99%, NOAH Technologies Corp, Texas) and 322.96 grams deionized (DI) water was used to dissolve 8.792 grams Al metal powder to make a sodium aluminate solution. All other materials and preparation conditions are the same as stated in Example 1. The AEI-type zeolite formed in this example was found to exhibit a silica:alumina ratio (SAR) of 16, as well as similar morphology as that described in Example 1. Measurements were obtained using XRD, ICP and SEM.

Example 3—Preparation & Characterization of Another Batch of AEI-Type Zeolites The source of alumina used in this example was aluminum sulfate octadecahydrate. A total of 170.19 grams of N, N-Dimethyl-3,5-dimethylpiperidinium hydroxide (TMPOH, 50%, Sachem) was placed into a 2 liter autoclave along with 0.56 grams NaOH (99%, NOAH Technologies Corp., Texas) and stirred until clear. Then, a total of 149.4 grams deionized (DI) water was measured and set aside for use throughout the remainder of this example. A total of 120 grams of the DI water was used to dissolve 85.87 grams aluminum sulfate octadecahydrate (NOAH Technologies Corp., Texas) to obtain an aluminum sulfate solution in a 250 ml beaker. This solution was added dropwise into the TMPOH and sodium hydroxide mixture solution with a total of 9.4 grams of the DI water being used to rinse the beaker. The resulting mixture was stirred for 5 minutes. Then, a total of 1393.96 grams sodium silicate (WR Grace, N Clear) was slowly added into above mixture with the remaining 20 grams of the DI water being used to rinse the beaker. The resulting mixture was stirred for 30 minutes. Then, 1 gram of a calcined AEI seed was added into the gel made above and the gel was allowed to Hydrothermally crystallize at 165° C. for 24 hours. Then, the slurry was filtered using a funnel filter With the collected wetcake being washed with 5 liters of DI water. The wetcake was then dried in an oven at 120° C. for overnight (e.g., about 10-12 hours). The resulting dried wetcake was broken apart and sieved through a 300 micrometer (μm) screen to obtain 145 grams of a powder.

Figure 4:
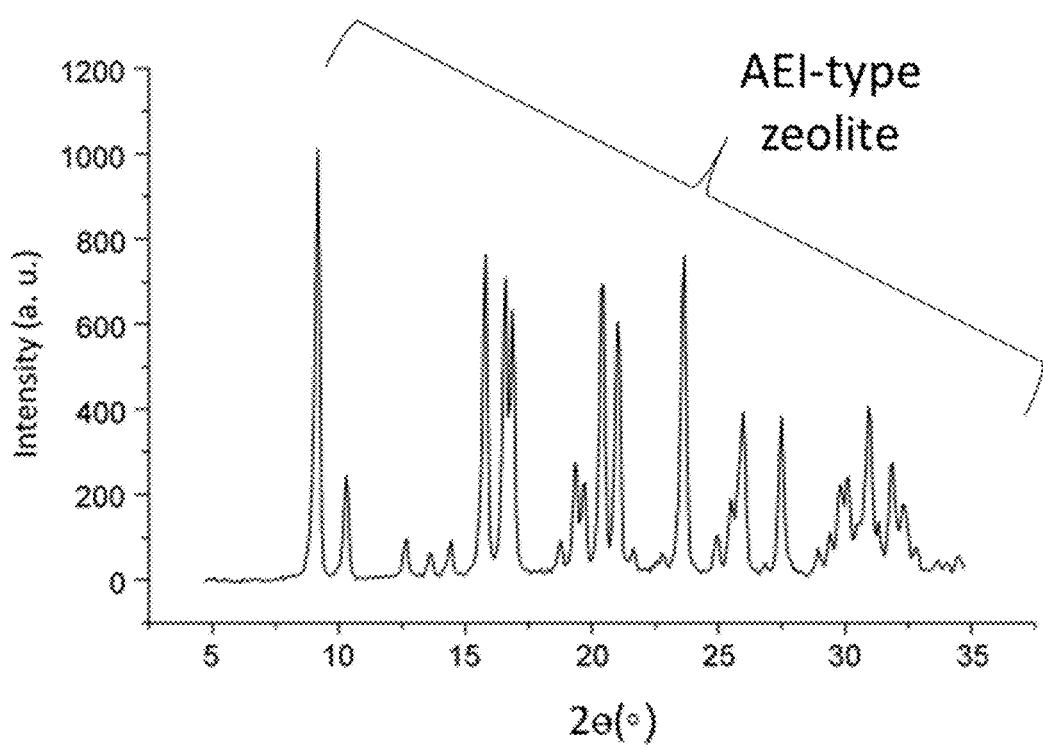
FIG. 4 is an x-ray diffraction (XRD) spectrum of the AEI-type zeolite made from aluminum sulfate according to the process of FIG. 1.

Referring now to FIG. 4, the measured x-ray diffraction (XRD) pattern for the powder collected and dried in this example shows an AEI-type zeolite structure or framework is present. The measured XRD pattern further demonstrates that this AEI-type zeolite is free of any other type of crystalline zeolite phase or structure such as the competing phase peaks of Analcime at 2θ~15.78°, 18.24°, 25.98° and Mordenite at 2θ~6.5°.

Figure 5:
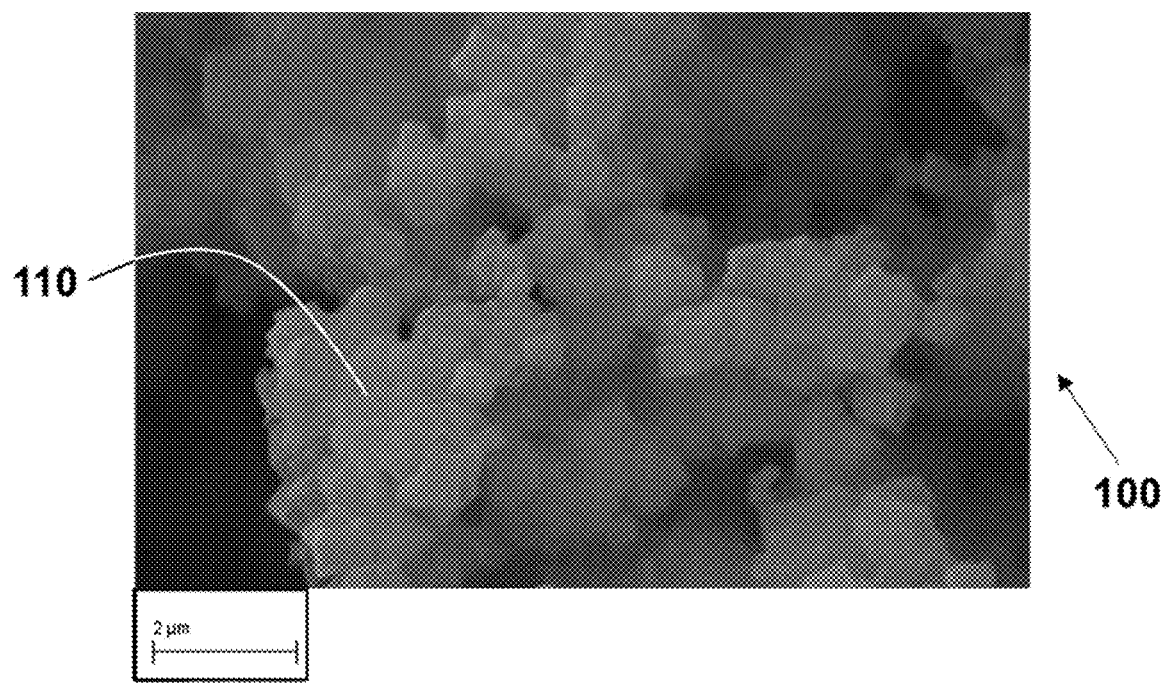
FIG. 5 is a scanning electron micrograph (SEM) of the AEI-type zeolite described in FIG. 4.

Referring now to FIG. 5, the morphology of the AEI-type zeolite collected and dried in this example is shown is the scanning electron micrograph to include square flake particles 110 with an average size of less than 1 micrometer.

The collected powder was calcined in a muffle furnace at 550° C. for 8 hours to remove template, i.e., the organic structure directional agent (OSDA) from the zeolite cage. Then, the calcined powder was ion exchanged twice using ammonium chloride at room temperature (e.g., about 20-25° C.) for 1 hour. After solid-liquid separation the wetcake was washed with DI water then oven dried overnight to obtain an ammonia-substituted form of the AEI-type zeolite. A protonated form of the AEI-type zeolite is obtained by performing the calcination at 450° C. for 16 hours.

The silica to alumina ($SIO_2:Al_2O_3$) ratio (SAR) was measured by ICP to be on the order of 16.4 with an $Na_2O$ content of 90 ppm. The surface area (SA), pore volume (PV) and particle diameter (PD) was measured using BET methodology with the data being shown below for both fresh zeolite and for the zeolite after being hydrothermally aged by exposure to 10% steam balanced by air at 900° C. for 1 hour:

Fresh: SA=589.82 m2/g, PV=0.283 cm3/g and PD=1.9 nm

After Ageing: SA=812.49 m2/g, PV=0.317 cm3/g and PD=1.6 nm.

The hydrothermal aged AEI-type zeolite shows high thermal-stability. The particle size data in the form of $D_{10}$, $D_{50}$, and $D_{90}$ was measured to be 0.5 micrometers (μm), 6.05 μm, and 20.46 μm.

Example 4—Temperature Programmed Desorption (TPD)

A Micromeritics Autochem 2920 II connected with a thermal conductivity detector (TCD) in MKS Cirrus Mass Spec equipment is used to test temperature programed desorption (TPD). In TPD measurements, the acid strength of a synthesized zeolite is monitored by using probe molecules having basic character, such as ammonia, and measuring the temperature at which they are desorbed.

Typically to obtain $NH_3$-TPD measurements, 0.1 g catalyst is pretreated at 500° C. for 30 minutes at a rate of 20° C./min in helium flowing at 25 mL min$^{-1}$ and then cooled to adsorption temperature of 100° C. The catalyst is saturated with diluted ammonia (10% Ammonia/90% Argon) at 100° C. for 30 minutes. After saturation, the sample is purged with helium at 25 mL min$^{-1}$, for 20 minutes to remove the weakly adsorbed ammonia on the surface of the zeolite. The temperature of the sample is then raised at a heating rate of 20° C./min from 100° C. to 650° C., with the flow helium maintained at 25 mL min$^{-1}$, and then finally held at 650° C. for 40 minutes. A mass spectrometer is used to monitor desorbed $NH_3$.

Figure 6:
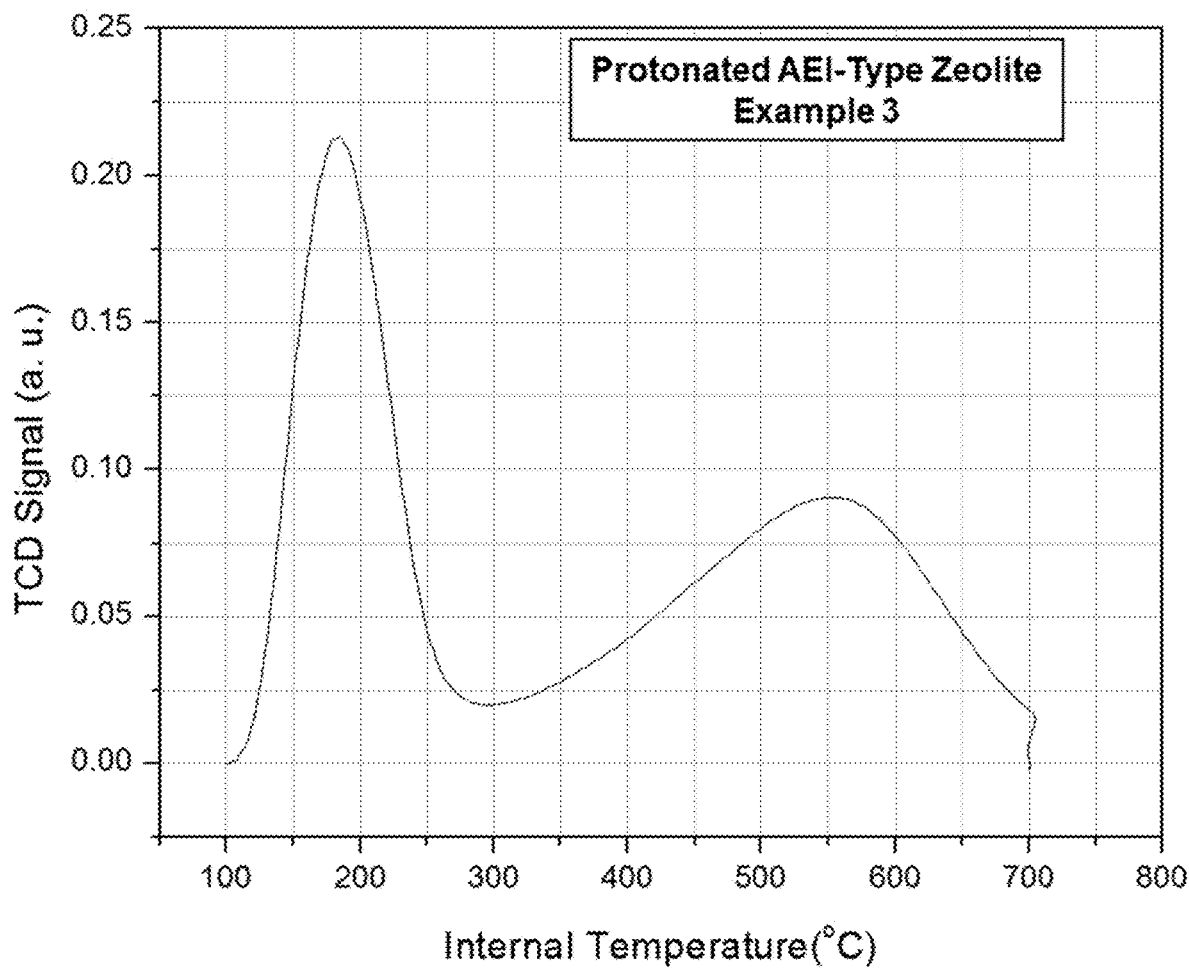
FIG. 6 is a graphical representation of the ammonia desorption profiles exhibited by a fresh zeolite sample prepared according to the teachings of the present disclosure.

NH3-TPD measurements were performed using the fresh protonated form of the AEI-type zeolite as prepared in Example 3. The amounts of ammonia desorbed from the zeolite sample is evaluated from the TPD peak areas. As shown in FIG. 6, two $NH_3$ desorption peaks are present. The $NH_3$ desorption peak at ~185° C. is associated with weak acid sites (Lewis Acidity site) and the other peak at a higher temperature of ~551° C. is associated with strong acid sites (Bronsted Acidity site). A Bronsted acidity of 1.552 mmol/g was measured by integrating the area of the second peak with 83% of theoretical value for SAR 16.1.

Example 5—Ion Exchanged Zeolites

Copper acetate was used for the ion exchange of copper (Cu) into the protonated form of the AEI-type zeolites prepared in Example 3. A total amount of 4.01% CuO was loaded in the structure of the AEI-type zeolite.

X-ray diffraction (XRD) spectra were measured for fresh Cu-loaded AEI-type zeolites and such zeolites after being hydrothermally aged at 900° C. for 2 hours. The spectra as shown in FIG. 7 show a high degree of stability in the structure after the initial Cu-loading (see [i] in FIG. 7) and after hydrothermal (see [ii] in FIG. 7).

This high thermal-stability was also evidenced in BET data for fresh Cu-AEI-type zeolites and such zeolites hydrothermally aged at 900° C. for 2 hours. This BET data is provided below for comparison:

Fresh SA=698.32 m$^2$/g, PV=0.266 m$^3$/g and PD=1.5 nm;

After Ageing SA=694.65 m$^2$/g, PV=0.265 m$^3$/g and PD=1.5 nm.

Example 6—NO$_x$ Conversion

The NO$_x$ conversion is tested utilizing the Micromeritics 2920 acting as a micro flow reactor and the MKS Residual Gas analyzer, which performs the analysis of gas concentrations after passing through the sample. The samples are typically tested with the follow gas concentrations: NO=175 ppm; $NO_2$=175 ppm; $NH_3$=350 ppm; and $O_2$=175 ppm. The samples are tested under 50,000$^{-1}$/hr space velocity. The NO$_x$ conversion numbers are calculated from a steady state condition after 45 minutes of consistent pressure through the MKS Residual Gas analyzer.

The fresh Cu-AEI-type zeolites formed in Example 5 show about 100% conversion over a wide temperature window from 350 to 680° C. as shown in FIG. 8. After hydrothermal aging at 850° C. for 16 hours, the Cu-AEI still has greater than 95% NOx conversion from 390 to 520° C.

After hydrothermal aging at 950° C. for 2 hours Cu-AEI-type zeolites is still alive for NOx conversion with greater than 80% NOx conversion in temperature from 400 to 520° C.

For the purpose of this disclosure, the terms "about" and "substantially" are used herein with respect to measurable values and ranges due to expected variations known to those skilled in the art (e.g., limitations and variability in measurements).

For the purpose of this disclosure any range in parameters that is stated herein as being "between [a $1^{st}$ number] and [a $2^{nd}$ number]" or "between [a $1^{st}$ number] to [a $2^{nd}$ number]" is intended to be inclusive of the recited numbers. In other words the ranges are meant to be interpreted similarly as to a range that is specified as being "from [a $1^{st}$ number] to [a $2^{nd}$ number]".

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An inexpensive method of making an AEI-type zeolite, the method consisting of the steps of:
    a) providing a source of silica;
    b) providing a source of alumina;
    c) providing an organic structure directional agent (OSDA);
    d) providing a source of alkali metal ions;
    e) mixing the source of alumina, OSDA, and alkali ions in water, then slowly adding the source of silica to form a gel composition; the gel composition being defined by a molar ratio for $SiO_2/Al_2O_3$ of 16:1 to 100:1; a molar ratio for $M_2O/SiO_2$ of 0.15:1 to 0.30:1; a molar ratio for $ROH/SiO_2$ of 0.05:1 to 0.20:1; and a molar ratio for $H_2O/SiO_2$ of 5:1 to 20:1; wherein M is the alkali metal ion and R is an organic moiety derived from the OSDA;
    f) adding a zeolite that exhibits an AEI framework or structure to the gel composition as a seed in order to facilitate the formation of the AEI-type zeolite, the seed being present in an amount of 0.01% to 10% by weight based on the amount of silica;
    g) heating the gel composition to a crystallization temperature that is in the range of about 135° C. to about 180°C;
    h) maintaining the gel composition at the crystallization temperature for a time period that ranges from 24 to 48 hours;
    i) allowing the AEI-type zeolite to crystallize and precipitate; the gel composition forming a crystalline precipitate of the AEI-type zeolite and a mother liquid;
    j) separating the crystalline precipitate from the mother liquid; and
    k) optionally, repeating steps a) to j);
    wherein the AEI-type zeolite has a silica to alumina ($SiO_2:Al_2O_3$) molar ratio of at least 8:1.

2. The method of claim 1, wherein the seed is present in an amount of 0.01% relative to about 1% silica.

3. The method of claim 1, wherein when steps a) to i) are repeated; the mother liquid is used as at least a portion of the water in step e).

4. The method of claim 1, wherein the method is a hydrothermal synthesis without the use of hydrogen fluoride (HF) that yields the AEI-type zeolite in the absence of any FAU zeolite Y.

5. The method of claim 1, wherein the source of silica includes one selected from sodium silicate, silica sol, fumed silica, tetraethyl orthosilicate, or a mixture thereof.

6. The method of claim 1, wherein the source of aluminum includes one selected from aluminum metal, aluminum hydroxide aluminum sulfate, aluminum nitrate, or a mixture thereof.

7. The method of claim 1, wherein the organic structure directional agent (OSDA) is one selected from N, N-Dimethyl-3,5-dimethylpiperidinium hydroxide, N, N-Diethyl-2,6-dimethylpiperidinium hydroxide, tetraethylphosphonium hydroxide, or a mixture thereof.

8. The method of claim 1, wherein the source alkali metal ions includes one or more of sodium hydroxide (NaOH) and potassium hydroxide (KOH).

9. The method of claim 1, wherein the molar ratio in the gel composition for $SiO_2/Al_2O_3$ is 20:1 to 60:1; for $M_2O/SiO_2$ is 0.20:1 to 0.26:1; for $ROH/SiO_2$ is 0.06:1 to 0.14:1; and for $H_2O/SiO_2$ is 7:1 to 15:1.

10. The method of claim 1, wherein the gel composition is heated to a crystallization temperature that is in the range of about 145° C. to about 165° C.

11. The method of claim 1, wherein the ratio of silica to alumina ($SiO_2:Al_2O_3$) in the AEI-type zeolite it greater than 8.

12. The method of claim 11, wherein the ratio of silica to alumina ($SiO_2:Al_2O_3$) in the AEI-type zeolite is greater than 14.

13. The method of claim 1, wherein the AEI-type zeolite has an average particle size that is less than 5 micrometers and a BET specific surface area that is greater than 500 $m^2/g$.

14. The method of claim 1, wherein the AEI-type zeolite exhibits a morphology that includes cubes, square flakes, irregular particles, or a combination thereof.

15. An AEI-type zeolite prepared according to the method of claim 1.

* * * * *